US011867229B2

(12) United States Patent
Baade et al.

(10) Patent No.: US 11,867,229 B2
(45) Date of Patent: Jan. 9, 2024

(54) LINEAR GUIDEWAY ASSEMBLY FOR CONTACTLESS LINEAR DISPLACEMENT OF A RIGID BODY RELATIVE TO ANOTHER RIGID BODY ALONG A LINEAR DISPLACEMENT PATH

(71) Applicant: VDL Enabling Technologies Group B.V., Eindhoven (NL)

(72) Inventors: Rick Baade, Eindhoven (NL); Antonius Theodorus Adrianus Peijnenburg, Eindhoven (NL)

(73) Assignee: VDL Enabling Technologies Group B.V., Eindhoven (NL)

( * ) Notice: Subject to any disclaimer, the term of this patent is extended or adjusted under 35 U.S.C. 154(b) by 213 days.

(21) Appl. No.: 17/604,704

(22) PCT Filed: Feb. 26, 2020

(86) PCT No.: PCT/NL2020/050123
§ 371 (c)(1),
(2) Date: Oct. 18, 2021

(87) PCT Pub. No.: WO2020/214025
PCT Pub. Date: Oct. 22, 2020

(65) Prior Publication Data
US 2022/0205483 A1     Jun. 30, 2022

(30) Foreign Application Priority Data

Apr. 19, 2019  (NL) ...................................... 2022986

(51) Int. Cl.
*F16C 32/04*     (2006.01)
(52) U.S. Cl.
CPC ................................ *F16C 32/0472* (2013.01)

(58) Field of Classification Search
CPC .. F16C 32/0472; F16C 29/00; F16C 32/0465; F16C 32/047
See application file for complete search history.

(56) References Cited

U.S. PATENT DOCUMENTS

| | | | |
|---|---|---|---|
| 5,196,745 A | 3/1993 | Trumper | |
| 11,187,268 B2 * | 11/2021 | Peijnenburg | ........ F16C 32/0472 |

FOREIGN PATENT DOCUMENTS

| | | |
|---|---|---|
| CN | 103 277 409 B | 2/2017 |
| JP | S62-165019 A | 7/1987 |

(Continued)

OTHER PUBLICATIONS

JPS62165019A_translate (Year: 1987).*
International Search Report and Written Opinion in International Application No. PCT/NL2020/050123, dated May 12, 2020 (9 pages).

*Primary Examiner* — Tulsidas C Patel
*Assistant Examiner* — Mohammed Ahmed Qureshi
(74) *Attorney, Agent, or Firm* — Nixon Peabody LLP (57) ABSTRACT

The invention relates to a linear guideway assembly for contactless linear displacement of a rigid body relative to another rigid body along a linear displacement path (x), said linear guideway assembly comprising: one, single rigid body formed as a linear guideway defining said linear displacement path as well as at least one rigid body formed as a product carrier being displaceable along said single linear guideway, wherein the linear guideway assembly further comprises multiple magnetic bearing assemblies for allowing contactless linear displacement of the at least one product carrier relative to the single, linear guideway, wherein all magnetic bearing assemblies are mounted to the product carrier in such way that the magnetic bearing assemblies are arranged in constraining five degrees of freedom (y, z, θ, Φ and ψ) of the product carrier relative to (Continued)

the single, linear guideway, whilst allowing one, translational degree of freedom (x) of the product carrier along the single, linear guideway, wherein all magnetic bearing assemblies, seen in the translational direction (x) of the linear displacement path, are mounted at the side of the product carrier closest to the single, linear guideway.

16 Claims, 6 Drawing Sheets

(56) References Cited

FOREIGN PATENT DOCUMENTS

| JP | S62165019 A | * | 7/1987 | ............. F16C 29/00 |
| WO | WO 2012/165872 A2 | | 12/2012 | |

* cited by examiner

LINEAR GUIDEWAY ASSEMBLY FOR CONTACTLESS LINEAR DISPLACEMENT OF A RIGID BODY RELATIVE TO ANOTHER RIGID BODY ALONG A LINEAR DISPLACEMENT PATH

CROSS-REFERENCE TO RELATED APPLICATIONS

The present application is a U.S. National Stage Entry of International Application No. PCT/NL2020/050123 filed on Feb. 26, 2020, which claims priority to and benefit of Netherlands Patent Application No. 2022986 filed on Apr. 19, 2019, each of which is hereby incorporated by reference in its entirety.

FIELD OF THE INVENTION

The invention relates to a linear guideway assembly for contactless linear displacement of a rigid body relative to another rigid body along a linear displacement path (x).

The invention also relates to a linear guideway assembly implementing one or more magnetic bearing assemblies.

BACKGROUND OF THE INVENTION

Magnetic bearing assemblies or in short magnetic bearings could provide an advantageous alternative to conventional rolling element bearings implementing rolling elements or fluid bearings. Given that magnetic bearings are contactless, there is no mechanical friction and thus very little particle generation. Moreover, there is no need for lubrication, which enables in vacuum operation without significant outgassing of molecular contamination. These aspects make that contamination seals can be omitted. The main challenges of applying magnetic bearings in high-tech in-vacuum systems lie in minimization of heat dissipation in the coils, minimizing eddy-current effects, implementation of a stable control system and linearization of the typically non-linear characteristics.

Magnetic bearing technology is already utilized in industrial applications. Rotary magnetic bearings are commercially available and applied in for example medical systems, turbo molecular vacuum pumps, cryogenic systems and machine tools. Another category are bearingless motors, where the rotor is magnetically suspended. Magnetic levitation is widely used in the actuation of planar stages, typically based on Lorentz forces. A separate type of magnetic bearings is based on reluctance forces, wherein a similar concept can also be used as actuator.

Although utilized in other fields, further development of magnetic bearing applications on a commercial scale in for example high cleanliness substrate handling robotics suffer from technological and constructional constraints. Commonly known magnetic bearing applications are characterized by their limited design dimensions, whereas known magnetic bearing applications with more than one degree of freedom are of a complex design and high price. Additionally, upscale implementation of magnetic bearing applications require the development of magnetic bearings of significant weight, size and cost, whereas conventional rolling element bearings are still available for similar purposes.

Preloading known linear rolling element bearings increases accuracy as to their displacement, although the preload also increases the risk on higher particle contamination. And although ceramic or hybrid rolling element bearings don't require any lubrication and therefore generate less molecular contamination, such bearings allow for a limited preloading capability and are therefore less suited for high load/high accuracy applications as in vacuum systems and under vacuum conditions.

Similarly fluid bearings exhibit a risk on turbulence (contamination) in atmospheric systems and impose an undesired gas load on vacuum systems.

The above mentioned bearing concepts all generate some sort of contamination, either particle or molecular contamination or both. In such applications seals are used to prevent migration of contamination towards a clean environment.

Known prior art applications, such as JP-562-165019, U.S. Pat. No. 5,196,745A1, WO2012/165872A2 and CN103277409, implement linear guideway assemblies for contactless linear displacement of a rigid body, wherein the rigid body is fully enclosed or locked in by the construction of the linear guideway. Such applications have several limitations, such as flexibility as to the transportation of the rigid body, but also a limited accessibility of the rigid body in particular when such application is implemented in a robotic handling system or in vacuum systems.

DESCRIPTION OF THE INVENTION

The invention aims to provide a solution for the above identified problems, allowing linear displacement of a rigid body relative to another rigid body along a linear displacement path and in particular allowing a contactless and frictionless control of a translational degree of freedom of a rigid body relative to another rigid body, wherein any preload on the rigid body to be displaced does not cause additional contamination of the environment.

Accordingly a linear guideway assembly is proposed, said assembly comprising one, single rigid body formed as a linear guideway defining said linear displacement path as well as at least one rigid body formed as a product carrier being displaceable along said single linear guideway, wherein the linear guideway assembly further comprises multiple magnetic bearing assemblies for allowing contactless linear displacement of the at least one product carrier relative to the single, linear guideway, wherein all magnetic bearing assemblies are mounted to the product carrier in such way that the magnetic bearing assemblies are arranged in constraining five degrees of freedom (y, z, θ, Φ and ψ) of the product carrier relative to the single, linear guideway, whilst allowing one, translational degree of freedom (x) of the product carrier along the single, linear guideway, wherein all magnetic bearing assemblies, seen in the translational direction (x) of the linear displacement path, are mounted at the side of the product carrier closest to the single, linear guideway.

By implementing one, single linear guideway as the linear displacement path guideway, and mounting all magnetic bearing assemblies, seen in the translational direction (x) of the linear displacement path, at the side, that is at one longitudinal side of the product carrier closest to the single, linear guideway, allows for displacement of the product carrier in one, translational degree of freedom (x) whilst constraining five degrees of freedom (y, z, θ, Φ and ψ) of the product carrier relative to the single, linear guideway. Such a simple, yet cheap construction provides a good alternative to conventional rolling element bearings or fluid bearings.

Additionally, the contactless nature of such a linear guideway assembly prevents any contamination and omits vacuum seals. The magnetic bearings do not impose a gas load in vacuum systems and do not cause turbulence in atmospheric systems.

In an example the single, linear guideway, seen in the translational direction (x) of the linear displacement path, is provided a first guidance recess present at the side of the linear pathway facing away from the product carrier, and a second guidance recess at the other side of the linear pathway facing towards the product carrier and wherein each magnetic bearing assembly at least in part is accommodated in one of said guidance recesses.

In particular two first magnetic bearing assemblies (y, θ) each are mounted at a forward side and a rearward side of the product carrier seen in the translational direction (x) of the linear displacement path and are accommodated in the first guidance recess.

In order to allow for a proper counterbalancing of the gravity forces exerted on the product carrier, whilst being supported at one side relative to the single, linear guideway, two second magnetic bearing assemblies (z, ψ) each are mounted at the forward side and the rearward side of the product carrier seen in the translational direction (x) of the linear displacement path and are accommodated in the second guidance recess.

In order to constrain rotation of the product carrier within the linear guideway assembly one third magnetic bearing assembly (Φ) is mounted between the forward side and the rearward side of the product carrier seen in the translational direction (x) of the linear displacement path and is accommodated in the first guidance recess.

Each said magnetic bearing assembly at least comprises at least one magnetic bearing module being mounted to the product carrier and consisting of at least:
 a ferromagnetic core;
 a first magnetic element positioned on a first side of said ferromagnetic core and directed towards the single, linear guideway;
 a coil being wound around said ferromagnetic core,
 said one bearing module being arranged in maintaining, during use, a gap distance with the single, linear guideway.

As such a magnetic bearing assembly is obtained, which allows a contactless linear displacement of a rigid body relative to another rigid body, without friction, which results in no particle generation or outgassing of lubricants. In particular a linear displacement of the rigid bodies relative to each other is herewith possible perpendicular to the direction of stiffness of the whole construction.

In particular in a advantageous embodiment the magnetic bearing module further comprises a setting module positioned on another side of the ferromagnetic core opposite to the first side and accommodated in either the first or second guidance recess of the single, linear guideway. Said setting module is arranged in setting a gap distance between the magnetic bearing module (the product carrier) and the single, linear guideway.

In particular said setting module is a controllable setting module allowing an enhanced control of the net force exerted on the magnetic bearing module can be controlled, and thereby also the position (the gap distances) of the magnetic bearing module mounted to the product carrier relative to the single, linear guideway.

In another embodiment said setting module comprises a second magnetic element, which is configured as a second permanent magnetic element. The second magnetic element serves to create a magnetic force acting in opposite direction of the active bearing module to provide preload and static force balance. For example, it provides a static, constant force required to create a constant counter force or to counter balance the gravity force created by the weight of the product carrier and its load and thus minimizes power dissipation.

Where one of both elements is mechanically adjustable with respect to the other for tuning of the force balance in steady-state and compensate for tolerance (e.g. permanent magnet tolerance). An additional advantage of this configuration is no power dissipation in steady-state conditions. This allows a further setting possibility of the magnetic bearing module by applying a constant pre-load in the direction opposite to that of the attraction force towards the first static back iron as generated by the ferromagnetic core and the first magnetic element, thereby controlling the gap distance between both rigid bodies and as such the contactless linear displacement of said rigid bodies relative to each other with zero heat dissipation.

In particular the ferromagnetic core is an E-core having a base, a center leg and two outer legs, wherein the first magnetic element positioned on the central leg and wherein the coil is wound around the center leg. In another example the E-core is a laminated E-core.

Additionally, the first magnetic element can be a permanent magnet.

BRIEF DESCRIPTION OF THE DRAWINGS

The invention will now be described in more detail with reference to the accompanying drawings, which drawings show in.

DETAILED DESCRIPTION OF THE DRAWINGS

For a better understanding of the invention like parts in the drawings are denoted with like reference numerals. The proposed concepts of a magnetic bearing assembly as depicted in the attached drawings consist of small bearing elements, which constrain a single translational degree of freedom of one rigid body with respect to another rigid body. It is to be noted that multiple bearing elements can be combined to constrain or control multiple degrees of freedom, as for example shown in the embodiment of FIGS. 3a and 3b.

Figure 1:
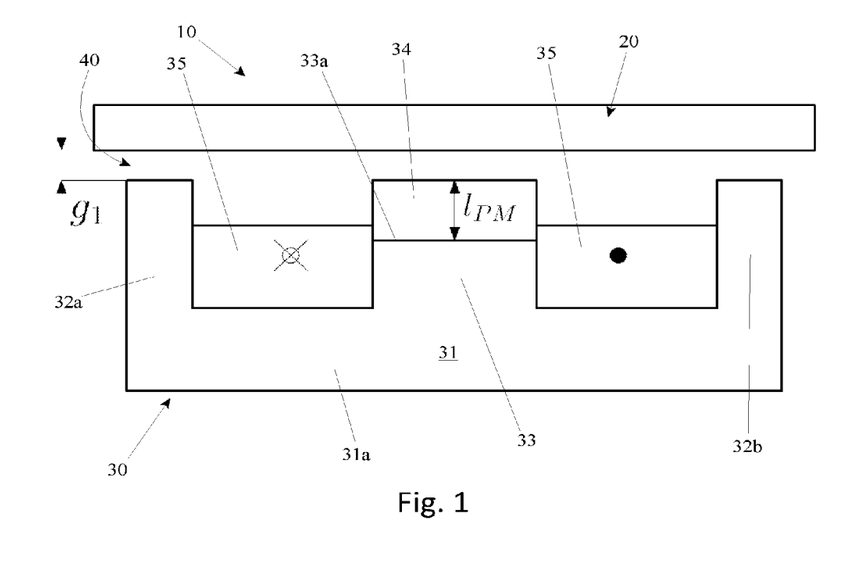
FIG. 1 a schematic example of an embodiment of a magnetic bearing assembly.

A first schematic example of a variable reluctance magnetic bearing assembly is depicted in FIG. 1. The magnetic bearing assembly of the example of FIG. 1 is denoted with reference numeral 10 (reference numeral 10' in FIGS. 2a-2b) and allows a contactless linear displacement (or a single translational degree of freedom) of a rigid body relative to another rigid body along a linear displacement path. In FIG. 1 one of said rigid bodies is denoted with reference numeral 30 (as well as in FIGS. 2a-2b and as reference numeral 300 in FIG. 3), whereas the other rigid body is denoted with reference numeral 20 (reference numeral 20a-20b in FIGS. 2a-2b and reference numeral 110 in FIG. 3).

The magnetic bearing assembly 10 comprising: at least one bearing module 31-34 being mounted to one of said rigid bodies 30 and consisting of at least a ferromagnetic core 31. For the sake of understanding it should be noted that any ferromagnetic core design can be implemented. However in this favorable example the ferromagnetic core 31 is an E-core having a base 31a, a center leg 33 and two outer legs 32a-32b. On a first side of the ferromagnetic core 31 a first magnetic element 34 is positioned and in this example the first end of the ferromagnetic core 31 is defined being located at the free end face 33a of the central leg 33. Also in this example a coil 35 is wound around the center leg 33 of the E-core.

However it is noted that any ferromagnetic core design having a coil wound around its core element and a magnetic element positioned on a first side of the ferromagnetic core can be implemented in the magnetic bearing assembly 10.

In addition the magnetic bearing assembly 10 interacts with a first static back iron or back bearing 20 being mounted to (or being part of) the other one of said rigid body 20 and positioned, during use, at some gap distance 40, indicated with g1 in FIG. 1, from said one bearing module 31-34.

Preferably, but no necessarily the ferromagnetic core being designed as an E-core 31 consists of a laminated E-core and the first magnetic element 34 is construed as a permanent magnet 34.

During use or during operation, the first static back bearing or back iron 20 is placed at a gap distance 40 (g1) from the E-core assembly 31-34-35. This configuration defines a low reluctance path, where the resulting magnetic flux density in the air gap g1 defined by the gap distance 40 will yield a gap dependent attraction force between the E-core assemble 31-34-35 (and as such the one rigid body 30) relative to the other rigid body, which is schematically depicted as the first static back bearing (back iron) 20.

The coil 35 being wound around the central leg or tooth 35 of the E-core 31 is used to either magnify or reduce the magnetic flux density in the air gap g1 (40), based on the direction and magnitude of an electric current running through the coil 35. It is noted, that the magnetic bearing assembly 10 (in fact the at least one bearing module 31-34-51) can only generate an attraction force and no repelling force between the E-core 31 and the first static back bearing (back iron) 20.

Figure 2A:
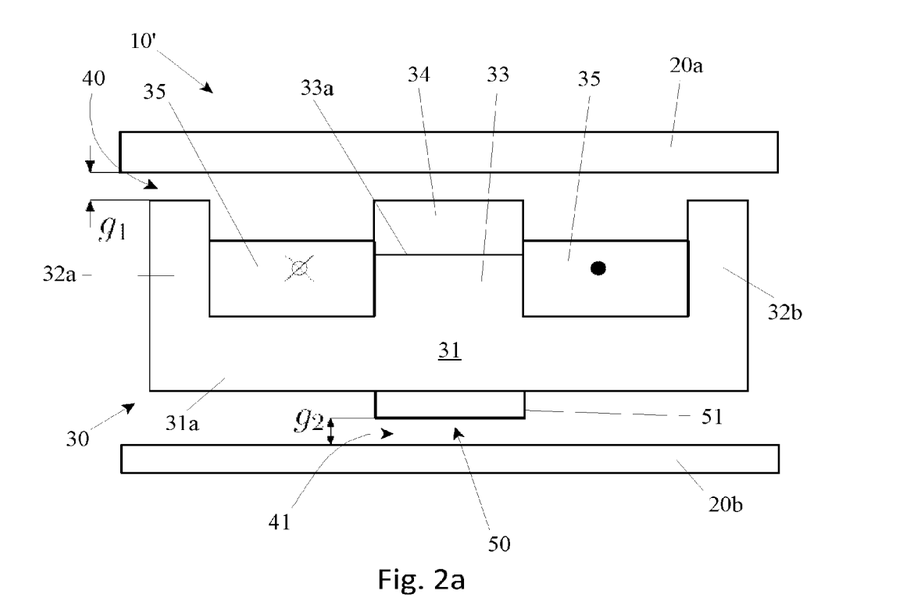
FIG. 2a a schematic example of another embodiment of a magnetic bearing assembly.
Figure 2B:
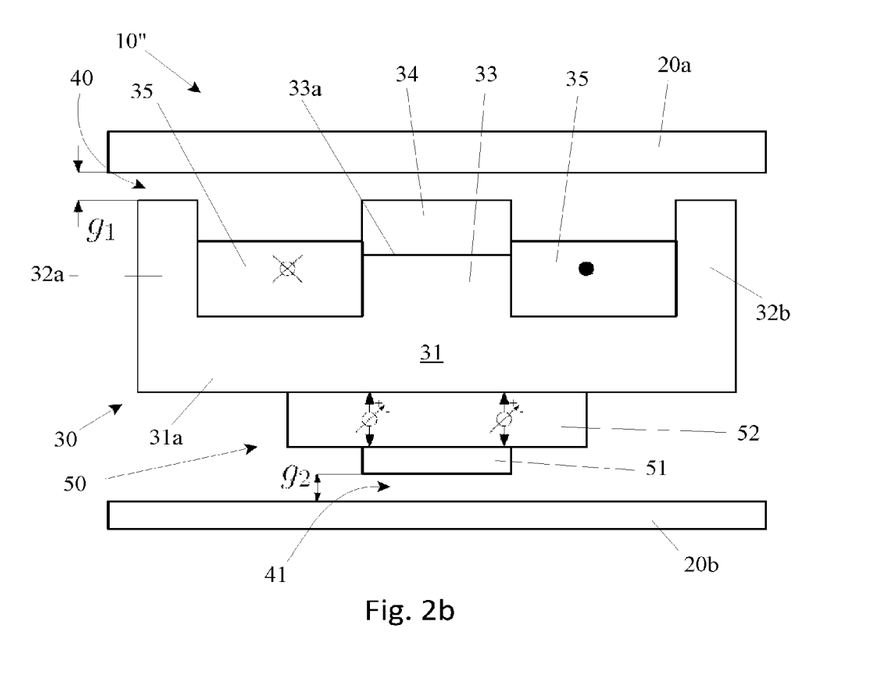
FIG. 2b a schematic example of yet another embodiment of a magnetic bearing assembly.

In FIGS. 2a-2b another example of a magnetic bearing assembly (denoted with 10') is shown. In this embodiment the magnetic bearing assembly 10' is provided with an additional setting module 50, which setting module 50 is positioned opposite to the first magnetic element side 33a-34 of the E-core 33. Preferably but not necessarily the setting module 50 comprises a second magnetic element 51.

The setting module 50 provides or applies a constant pre-load to the magnetic bearing assembly 10' in the direction opposite to that of the attraction force as generated by the E-core 31 and first magnet 34. The resulting net force on the magnetic bearing module 31-34-50 as such can be controlled, and thereby also the position (in fact the distance g1) of the rigid body 30 to which the magnetic bearing module 31-34-50 is mounted relative to a further static back iron 20b being part of the other static back iron 20a of said rigid body 20.

It is noted, that in FIGS. 2a-2b both reference numerals 20a-20b are considered representing constructional elements, which are part of one and the same rigid body defined as the single, linear guideway in the pending claims, whereas reference numeral 30 constitutes the other rigid body defined as the product carrier in the pending claims and that the magnetic bearing assembly as described herein allows contactless linear displacement of the substrate/product carrier (30) relative to the single, linear guide way (20a-20b) of the linear guideway assembly along the linear displacement path (x). Depending on the orientation of the bearing module 31-34-50 being mounted to the substrate/product carrier (30), counter balancing the gravity force (based on the weight of the magnetic bearing module 31-34-50) could provide at least part of this pre-load.

As such reference numeral 20a defines the first static back bearing or back iron, whereas reference numeral 20b defines the further static back bearing or back iron.

The pre-load can be enhanced by constituting said setting module 50 as a second magnet 51, being positioned on the opposed side of the E-core/spoil/first magnet configuration 33-35-34, as shown in FIG. 2a. In particular the second magnet 51, which could a permanent magnet 51 can be mounted to the other side of the E-core 31 in particular to the other side of the base 31a.

This second (permanent) magnet 51 will create a preload force in the air gap g2 (41) between the magnetic bearing module 31-34-35-50 mounted on one of the rigid bodies 30 and the other one 20b of the rigid bodies. the other one 20b of the rigid bodies. Energy dissipation of the bearing module can be minimized by tuning the magnetic pre-load force as exerted by the setting module 51, such that all static forces are balanced. In this case, the electromagnet (E-core 31 and spoil 35) is only required to counteract dynamic disturbances during the linear displacement of the one rigid body 30 relative to the other rigid body 20a-20b. Manufacturing tolerances and the relatively large variations on the dimensions and magnetic moment of permanent magnets may introduce deviations from this static force balance.

In a further example 10" of the magnetic bearing assembly according to the invention (see FIG. 2b) the setting module 50 comprises, next to the second permanent magnet 51, a controllable adjustment mechanism 52 being positioned between the base 31a of the E-core 31 and the second (permanent) magnet 51. Herewith a preset of the distance or the air gap g2 (41) between the magnetic bearing module 31-34-35-50 mounted on one of the rigid bodies 30 and the other one 20b of the rigid bodies is possible, thereby allowing to tune the pre-load force, such that the static forces exerted by both the first and second magnets 34-51 are balanced and any energy dissipation is minimized.

Combining this example with a position sensor (or a flux sensor) and motion control software (not shown), consisting of a current control loop and a position control loop, the air gap 40 (g1) between the magnetic bearing module 31-34-35 and the first static back iron 20 being mounted to the other one of said rigid bodies can be actively controlled to compensate for dynamic disturbance forces occurring during the linear displacement of one of the rigid bodies relative to the other one of the rigid bodies (30; 20a-20b) by regulating the current through the electromagnet 33-35.

Figure 3A:
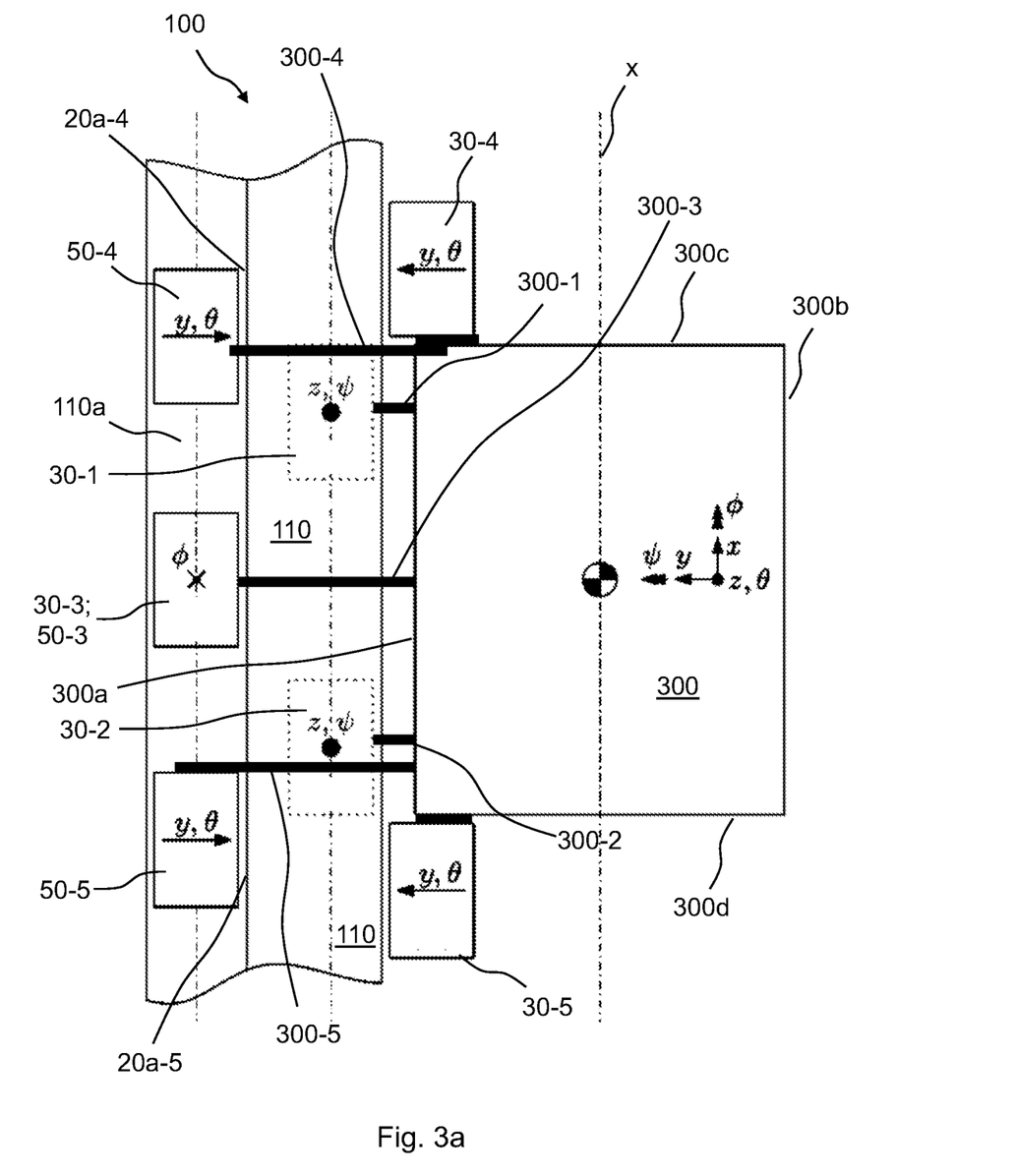
FIG. 3a a top view of a schematic example of an embodiment of a linear guideway assembly according to the invention.
Figure 3B:
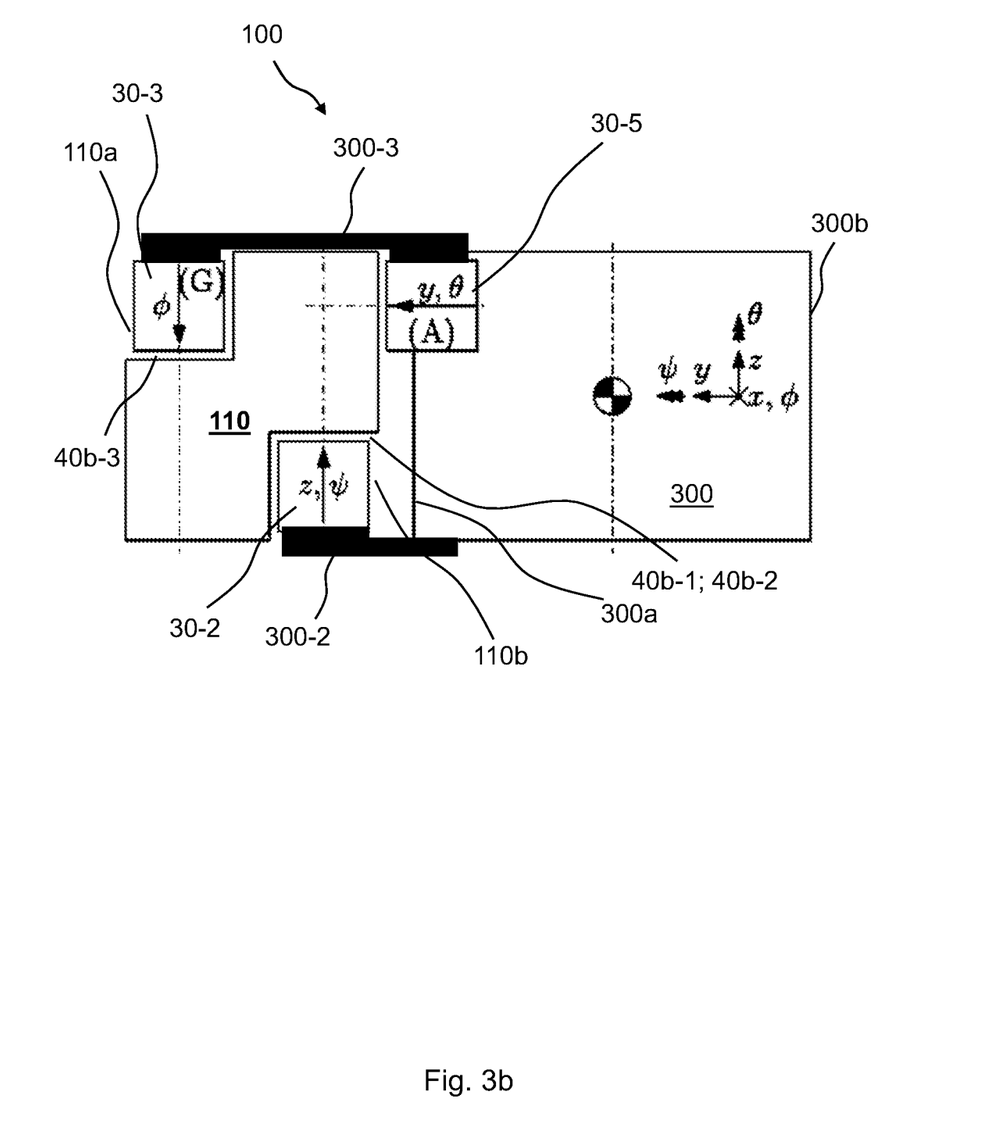
FIG. 3b a front view of a schematic example of an embodiment of a linear guideway assembly according to the invention.
Figure 3C:
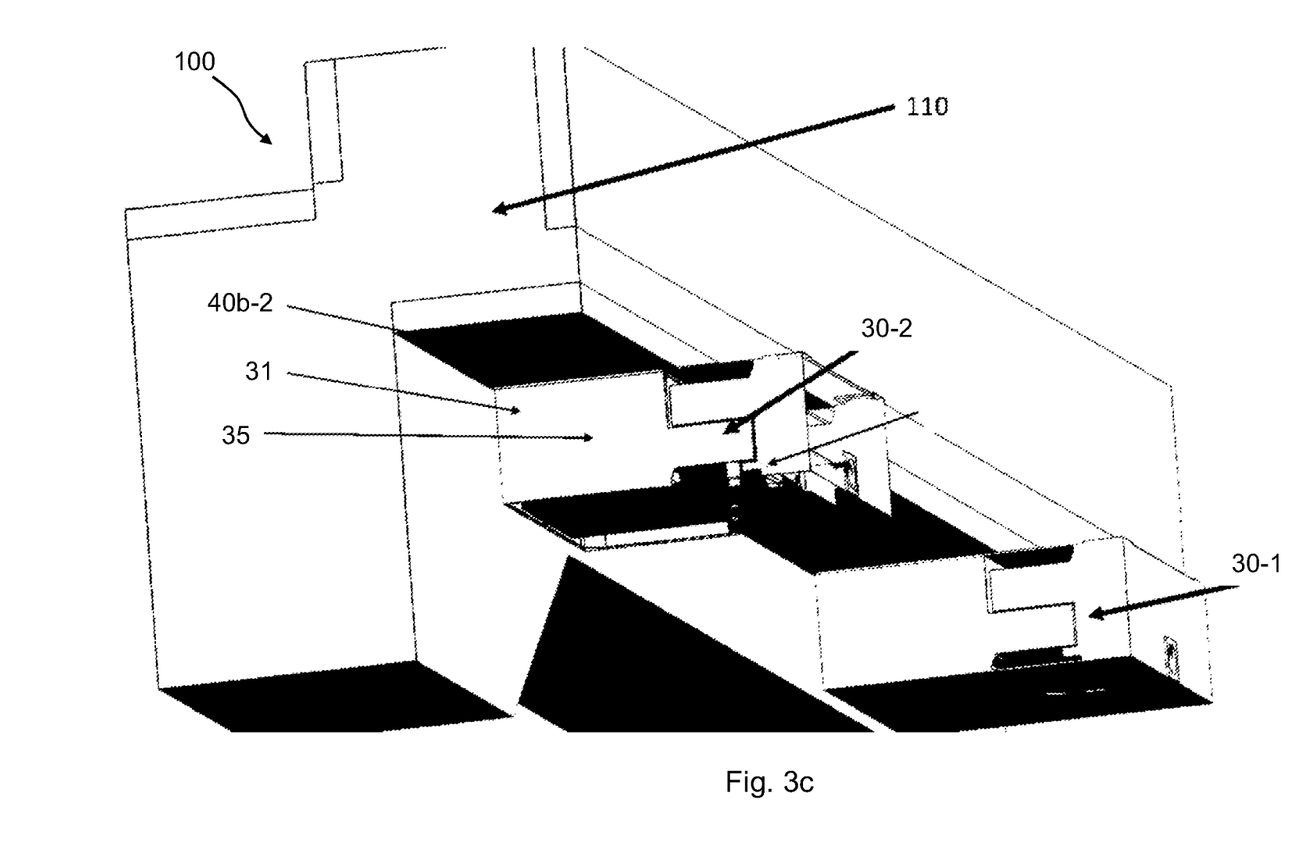
FIG. 3c a detail view of a FIG. 3b.

In FIGS. 3a, 3b and 3c an example (in a top view, front view and detailed view respectively) is depicted of an implementation or application of multiple magnetic bearing assemblies in a linear guidance assembly 100. In this non-limitative example a total of five magnetic bearing assemblies 30-1; 30-2; 30-3; 30-4+50-4; 30-5+50-5 are shown, which are interacting with rigid bodies 110 and 300. Rigid body 300 is defined as a substrate/product carrier, whereas rigid body 110 is defined as a single, linear guide way and functioning as a fixed world for the substrate/product carrier 300 to move along.

The magnetic bearing assemblies 30-1; 30-2; 30-3; 30-4+50-4; 30-5+50-5 as described herein allow a contactless linear displacement of the product carrier 300) relative to the single, linear guideway 110 along a linear displacement path (x). The carrier 300 is preferably configured as a flat, square or rectangular support element for supporting semiconductor products during its transportation along the linear displacement path (x). The carrier 300 has a first longitudinal side 300a, a second longitudinal side 300b opposite from the first longitudinal side 300a, a forward side 300c and a rearward side 300d (opposite from the forward side 300c), both seen in the transport direction or linear displacement path (x) along the single, linear guideway 110.

The linear guideway assembly 100 comprises one single, linear guideway or guide rail 110. This means that the carrier 300 is supported, guided and transported at its first longitudinal side 300a along the linear displacement path (x) by means of the single, linear guideway or guide rail 110, whereas the other, second opposite longitudinal side 300b is unsupported and freely moving along linear displacement path (x).

In this non-limitative example the single, linear guide rail 110 is provided with a first guidance recess 110a, which extends in the longitudinal direction (x) of the guide rail 110 at a side of the guide rail 110 facing away from the product carrier 300. Additionally the single, linear guide rail 110 is provided with a second guidance recess 110b, which extends in the longitudinal direction (x) of the guide rail 110 at a side of the guide rail 110 facing towards the product carrier 300. Both guide recesses 110a-110b serve to accommodate in part one or more magnetic bearing assemblies 30-1; 30-2; 30-3; 30-4+50-4; 30-5+50-5. The magnetic bearing assemblies 30-1; 30-2; 30-3; 30-4+50-4; 30-5+50-5 are mounted to the carrier 300 by means of several carrier supports 300-1; 300-2; 300-3; 300-4; 300-5. The product carrier 300 is mounted to and guided along a linear guideway 100 formed by the single, linear guide rail 110.

It is noted that the product carrier 300 constitutes one of the rigid bodies and the guide rail 110 constitute the other one of the rigid bodies as defined in the pending claims and as clarified in relation to the example of FIG. 2a-2b and FIG. 3a-c.

In particular in this example of a linear guideway assembly 100 the several magnetic bearing assemblies 30-1; 30-2; 30-3; 30-4+50-4; 30-5+50-5 are implemented in a straight guideway with a displacement stroke of for example 600 mm, as part of a substrate carrier handling robot in a high cleanliness substrate handling environment. The single, straight or linear guideway 110 allows one translational degree of freedom (x) available for actuation, meaning allowing the carrier 300 to be displaced in the x-direction along the linear displacement path defined by the single, linear guideway 110.

The five remaining degrees of freedom y, z, θ, Φ and ψ are constrained as depicted schematically in the FIGS. 3a-3b-3c. The magnetic bearing assemblies 30-1; 30-2; 30-3; 30-4+50-4; 30-5+50-5 are connected or mounted to the product carrier 300 and constrain the five degrees of freedom y, z, θ, Φ and ψ with respect to a displacement beam (not shown) being part of a proceeding link or arm of the robot. In this example five magnetic bearing assemblies 30-1; 30-2; 30-3; 30-4+50-4; 30-5+50-5 are applied.

The magnetic bearing modules as implemented in this example are based on the variable reluctance principle and consist of an electromagnetic actuator, a position measurement and optionally a permanent magnet for preloading, the latter feature to be used to provide a static, constant force required to create a constant counter force or to counter balance the gravity force created by the weight of the product carrier and its load and thus minimizes power dissipation. Each of these bearing modules is able to generate an attractive force only (thus a force in one direction only). A preload force in opposite direction relative to the attraction force is required to allow actuation in both directions.

Three magnetic bearing assemblies 30-1; 30-2; 30-3; constrain the out of plane degrees of freedom of the carrier 300 with respect to the single, linear guideway or guide rail 110, namely the z, Φ and ψ directions. Two additional magnetic bearing assemblies 30-4+50-4; 30-5+50-5 impose the remaining in-plane degrees of freedom y and θ.

Any pre-loading as described above for the three out of plane magnetic assemblies 30-1; 30-2; 30-3 is performed (biased) by means of gravity and therefore do not implement an additional setting module 50 as depicted in FIG. 2a-2b, which setting module functions as a pre-stressing bearing. This is a clear advantage of this embodiment.

Adjusting or pre-loading of the three out of plane magnetic bearing assemblies 30-1, 30-2 and 30-3 is performed by means of the electromagnet formed by the E-core 31 and coil 35 of each magnetic bearing assemblies 30-1; 30-2; 30-3 (see FIG. 2a-2b) by adjusting the air gaps 40b-1; 40b-2; 40b-3 for each magnetic bearing assembly, and thereby matching the static force of the assembly with gravity, again to minimize steady state dissipation.

Similarly the electromagnet formed by the E-core 31 and coil 35 of each magnetic assemblies 30-1; 30-2; 30-3 together with their respective first permanent magnets 34-1; 34-2; 34-3 pre-set and control the air gap distance g1 (40b-1; 40b-2; 40b-3) between the product carrier 300 and the single, linear guide rail 110.

Preloading of the magnetic assemblies 30-1; 30-2; 30-3 can be done using permanent magnets 34-1; 34-2; 34-3 instead of by the weight of the mechanism at the cost of additional negative stiffness that needs to be compensated for by the control loop.

The magnetic bearing modules 30-1 and 30-2 constrain the out of plane degrees of freedom z and iv and are accommodated in the second guidance recess 110b of the single, linear guidance rail 110. These magnetic bearing modules are preloaded by the gravitational force of the carriage and payload mass. As such, these two magnetic bearing modules 30-1 and 30-2 contain a permanent magnet 34 (see FIGS. 2a-2b) to generate a static force that compensates for the weight of the substrate/product carrier 300 and its payload (e.g. a semiconductor substrate) mounted thereon. The air gap of these bearings can be adjusted mechanically to balance the force of the static permanent magnet 34 with the constant force required to carry the weight and thereby minimize power dissipation. The magnetic bearing modules 30-1 and 30-2 can compensate for tolerances in the permanent magnet and mechanical tolerances. Displacement sensors are used to close the control loop, again one sensor for each individual bearing module.

The magnetic bearing module 30-3 constrains the rotation degree of freedom Φ, preventing undesired rotation of the substrate/product carrier 300 in its plane defined by the carrier. Magnetic bearing module 30-3 is accommodated in the first guidance recess 110a of the single, linear guidance rail 110 and contains a permanent magnet 34 preloaded by gravity to balance static forces in order to minimize dissipation. A displacement sensor is used to close the control loop.

The in-plane degree of freedom y and a are pre-loaded by the two magnetic assemblies 30-4+50-4 and 30-5+50-5. The position control loop is closed using displacement sensors (e.g. capacitive, optical or other). Each individual setting module 50-4 and 50-5 requires one displacement sensor but do not implement a second permanent magnet 51 due to the absence of any static force acting on these bearings. Alternatively the preloading of the setting module 50-4 and 50-5 can be done using permanent magnets 51, but this will create additional negative stiffness that needs to be compensated for by the control loop.

The setting modules 50-4 and 50-5 are accommodated in the first guidance recess 110a of the single, linear guideway/guiderail 110 and provide a preload force for the y and θ bearing modules 30-4 and 30-5. In static conditions, both the bearing modules 30-4+30-5 and the setting modules 50-4+50-5 generate a small (opposite) attraction force of a few Newton to avoid magnetic hysteresis. The preload bearings don't require any position sensors. An alternative preload mechanism could consist of only permanent magnets 51 to generate a constant force, although the negative stiffness inherent to two permanent magnets working against each other is avoided in this case. The air gap of the preload bearings can be adjusted mechanically to compensate for mechanical tolerances.

Here the setting modules 50-4 and 50-5 as well as the magnetic bearing modules 30-4 and 30-5 (each composed of the E-cores 31, the coil 35 and the first permanent magnets 34-4 and 34-5 respectively) are mounted on the same sides of the product carrier 300 controlling or maintaining a desired air gap 20a-4 and 20a-5 between the substrate/product carrier 300 and the single, linear guide rail 110.

In contrast to conventional rolling element linear bearings where five degrees of freedom are constrained, the five constrained degrees of freedom can be controlled actively using the active controllable magnetic bearing assemblies 30-1; 30-2; 30-3; 30-4+50-4; 30-5+50-5 and thereby correct for undesired dynamic behavior of the robot, which is displacing the substrate/product carrier 300 along the guide rail 110 of the linear guideway assembly 100.

The examples above of magnetic bearing assemblies as defined in the pending claims are highly suitable for implementation on a commercial scale in high cleanliness substrate handling robotic application. In particular, with the product carrier being supported, guided and transported at one, single longitudinal side thereof by one, single linear guideway with the other, opposite longitudinal side as well as its forward and rearward side of the product carrier being unsupported and freely moving along the linear displacement path (x) defined by the one, single linear guideway improves the accessibility and visibility of the work place around the product carrier significantly.

In particular such product carrier with one, single longitudinal side being supported, guided and transported and with the opposite, side being unsupported and freely moving side exhibits an increased accessibility for robotic applications, such as robotic pick-and-place arms.

The magnetic bearing assemblies of the present invention can be constructed with limited dimension and at low costs and be easily implemented in a thermally critical system and vacuum environment, such as a substrate wafer handling application, where a stable and well-controlled linear displacement of one rigid body (a substrate carrier 300) relative to another rigid body (the guide way assembly 100-110) is essential for quality assurance purposes.

In particular the magnetic bearing assembly as proposed allow for displacement stability, stiffness and energy dissipation in such thermally critical systems and vacuum environments which is not possible with commonly known rolling bearings.

The invention claimed is:

1. A linear guideway assembly for contactless linear displacement of a movable rigid body relative to another rigid body along a linear displacement path (x), said linear guideway assembly comprising:
   one, single rigid body formed as a single linear guideway defining said linear displacement path as well as
   at least one movable rigid body formed as a product carrier being displaceable along said single linear guideway, wherein
   the linear guideway assembly further comprises a group of multiple magnetic bearing assemblies for allowing contactless linear displacement of the at least one product carrier relative to the single, linear guideway, wherein
   the group of magnetic bearing assemblies is mounted to the product carrier in such way that the group of magnetic bearing assemblies is arranged in constraining five degrees of freedom (y, z, θ, Φ and ψ) of the product carrier relative to the single, linear guideway, whilst allowing one, translational degree of freedom (x) of the product carrier along the single, linear guideway, wherein
   the product carrier at least comprises a first longitudinal side and a second longitudinal side opposite from the first longitudinal side oriented in the direction of the linear displacement path (x), and wherein the product carrier is supported, guided and transported at its first longitudinal side along the linear displacement path (x) by means of the single, linear guideway, whereas the other, second opposite longitudinal side is unsupported and freely moving along the linear displacement path (x), and wherein the group of magnetic bearing assemblies, seen in the direction of the liner displacement path, is mounted at the first longitudinal side of the product carrier closest to the single, linear guideway.

2. A linear guideway assembly for contactless linear displacement of a movable rigid body relative to another rigid body along a linear displacement path (x), said linear guideway assembly comprising:
   one, single rigid body formed as a single linear guideway defining said linear displacement path as well as
   at least one movable rigid body formed as a product carrier being displaceable along said single linear guideway, wherein
   the linear guideway assembly further comprises a group of multiple magnetic bearing assemblies for allowing contactless linear displacement of the at least one product carrier relative to the single, linear guideway, wherein
   the group of magnetic bearing assemblies is mounted to the product carrier in such way that the group of magnetic bearing assemblies is arranged in constraining five degrees of freedom (y, z, θ, Φ and ψ) of the product carrier relative to the single, linear guideway, whilst allowing one, translational degree of freedom (x) of the product carrier along the single, linear guideway, wherein
   the product carrier at least comprises a first longitudinal side and a second longitudinal side opposite from the first longitudinal side oriented in the direction of the linear displacement path (x), and wherein the product carrier is supported, guided and transported at its first longitudinal side along the linear displacement path (x) by means of the single, linear guideway, whereas the other, second opposite longitudinal side is unsupported and freely moving along the linear displacement path (x), and wherein the group of magnetic bearing assemblies, seen in the direction of the liner displacement path, is mounted at the first longitudinal side of the product carrier closest to the single, linear guideway, wherein the single, linear pathway, seen in the translational direction (x) of the linear displacement path, is provided a first guidance recess present at the side of the linear pathway facing away from the product carrier, and a second guidance recess at the other side of the linear pathway facing towards the product carrier and wherein each magnetic bearing assembly at least in part is accommodated in one of said guidance recesses.

3. The linear guideway assembly according to claim 2, wherein two first magnetic bearing assemblies (y, θ) each are mounted at a forward side and a rearward side of the product carrier seen in the translational direction (x) of the linear displacement path and are accommodated in the first guidance recess.

4. The linear guideway assembly according to claim 2, wherein two second magnetic bearing assemblies (z, ψ) each are mounted at the forward side and the rearward side of the product carrier seen in the translational direction (x) of the linear displacement path and are accommodated in the second guidance recess.

5. The linear guideway assembly according to claim 2, wherein one third magnetic bearing assembly (Φ) is mounted between the forward side and the rearward side of the product carrier seen in the translational direction (x) of the linear displacement path and is accommodated in the first guidance recess.

6. The linear guideway assembly according to claim 2, wherein each said magnetic bearing assembly at least comprising:
at least one magnetic bearing module being mounted to the product carrier and consisting of at least:
a ferromagnetic core;
a first magnetic element positioned on a first side of said ferromagnetic core and directed towards the single, linear guideway;
a coil being wound around said ferromagnetic core,
said one bearing module being arranged in maintaining, during use, a gap distance with the single, linear guideway.

7. The linear guideway assembly according to claim 6, wherein the magnetic bearing module further comprises a setting module positioned on another side of the ferromagnetic core opposite to the first side and accommodated in either the first or second guidance recess of the single, linear guideway.

8. The linear guideway assembly according to claim 7, wherein said setting module is arranged in setting said gap distance between the bearing module and the single, linear guideway.

9. The linear guideway assembly according to claim 7, wherein said setting module is a controllable setting module.

10. The linear guideway assembly according to claim 7, wherein said setting module comprises a second magnetic element, which is configured as a second permanent magnetic element.

11. The linear guideway assembly according to claim 6, wherein the ferromagnetic core is an E-core having a base, a center leg and two outer legs.

12. The linear guideway assembly according to according to claim 11, wherein the first magnetic element positioned on the central leg.

13. The linear guideway assembly according to claim 11, wherein the coil is wound around the center leg.

14. The linear guideway assembly according to claim 11, wherein the E-core is a laminated E-core.

15. The linear guideway assembly according to claim 6, wherein the first magnetic element is a permanent magnet.

16. The linear guideway assembly according to claim 6, wherein each said magnetic bearing assembly is arranged in exerting a force in one direction only.

* * * * *